United States Patent [19]

Achelpohl

[11] 4,452,443

[45] Jun. 5, 1984

[54] APPARATUS FOR DISTRIBUTING CONTINUOUSLY SUPPLIED TUBE SECTIONS TO THREE PRODUCTION LINES FOR MAKING SACKS

[75] Inventor: Fritz Achelpohl, Lengerich, Fed. Rep. of Germany

[73] Assignee: Windmoller & Holscher, Lengerich, Fed. Rep. of Germany

[21] Appl. No.: 298,586

[22] Filed: Sep. 2, 1981

Related U.S. Application Data

[63] Continuation-in-part of Ser. No. 062,430, Jul. 31, 1979, abandoned.

[30] Foreign Application Priority Data

Aug. 3, 1978 [DE] Fed. Rep. of Germany ..... 28341062

[51] Int. Cl.$^3$ .......................... B31B 1/08; B65H 5/18; B65H 29/40; B65G 29/00

[52] U.S. Cl. .................................. 271/279; 271/184; 271/225; 198/457; 198/369; 198/436

[58] Field of Search ............... 271/184, 225, 279, 298, 271/302, 303, 304, 305, 236, 237, 238, 248, 250, 252; 198/457, 369, 436, 787

[56] References Cited

U.S. PATENT DOCUMENTS

| | | | |
|---|---|---|---|
| 2,181,241 | 11/1939 | Klemm | 271/225 X |
| 2,476,371 | 7/1949 | Haumann | 271/302 X |
| 2,478,610 | 8/1949 | Uschmann et al. | 271/302 X |
| 3,080,956 | 3/1963 | Salzmann | 271/184 X |
| 3,110,389 | 11/1963 | Clark | 198/457 |
| 3,179,234 | 4/1965 | Bloom et al. | 271/302 X |
| 3,264,917 | 8/1966 | Califano et al. | 271/303 X |
| 3,575,276 | 4/1971 | Rupert | 198/457 X |
| 4,160,500 | 7/1979 | VerMehren | 198/457 |

FOREIGN PATENT DOCUMENTS

| | | | |
|---|---|---|---|
| 546427 | 3/1932 | Fed. Rep. of Germany | 271/236 |
| 2307728 | 9/1974 | Fed. Rep. of Germany . | |
| 2439666 | 3/1976 | Fed. Rep. of Germany . | |
| 593653 | 8/1925 | France | 271/236 |
| 804875 | 11/1958 | United Kingdom | 271/279 |
| 1524991 | 9/1978 | United Kingdom . | |

*Primary Examiner*—Bruce H. Stoner, Jr.
*Assistant Examiner*—James E. Barlow
*Attorney, Agent, or Firm*—Fleit, Jacobson, Cohn & Price

[57] ABSTRACT

Flattened tube sections for making sacks are continuously supplied by a main conveyor and selectively fed longitudinally to one of a plurality of connecting conveyors leading to respective production lines along which the sections are moved transversely after turning by respective turntables. The connecting conveyors for the second and subsequent production lines receive their tube sections from an intermediate conveyor. A deflector is pivotable between the intermediate conveyor and the connecting conveyor for the first production line.

2 Claims, 5 Drawing Figures

APPARATUS FOR DISTRIBUTING CONTINUOUSLY SUPPLIED TUBE SECTIONS TO THREE PRODUCTION LINES FOR MAKING SACKS

CROSS-REFERENCE TO RELATED APPLICATION

This application is a continuation-in-part of U.S. patent application Ser. No. 062,430, filed July 31, 1979, now abandoned.

BACKGROUND OF THE INVENTION

1. Field of the Invention

The invention relates to an apparatus for uniformly distributing tube sections continuously supplied by a first conveyor in a longitudinal direction to conveying lines which adjoin said first conveyor, convey at right-angles thereto and lead to processing stations. Preferably, the tube sections are conveyed to sewing lines for applying base stitching to the tube sections. The apparatus comprises a connecting conveyor leading to the first conveying line and an intermediate conveyor bridging the first intersection, which are connectible to the main conveyor by a deflector in the order of the distribution of the tube sections.

2. Description of the Prior Art

Machines for making tube sections produce many more tube sections than can be processed by one apparatus for providing the tube sections with bases or base stitching. For this reason, one machine making tube sections is followed by a plurality of production lines for finishing the sacks. This gives rise to the problem of fully automatically and uniformly distributing the tube sections to the production lines.

In an apparatus of this kind known from DE-OS No. 23 07 728, distribution of the tube sections from the first conveyor to the individual production lines is effected in that the connecting conveyor connected to the main conveyor by a deflector alternately drops one workpiece into a trap box associated with each intersection and equipped with means for opening the base of the box. The workpiece drops from the trap box into a subposed table from which it is pushed by a slide into the inlet gap of the conveyor leading to each processing station. The intersection of the known apparatus not only has a complicated construction but it is also possible for disruptions to occur at this position caused by an inaccurate transfer of the tube sections.

A control system is described in DE-OS No. 23 07 728 for controlling alternate movement of the deflectors associated with each of the individual production lines. The control system includes a plurality of first light barriers for sensing the gaps between successive workpieces on a main conveyor and for generating interval signals when a workpiece is sensed. One of the first light barriers is associated with each of the deflectors. A second light barrier is positioned upstream of each of the first light barriers and is designed to produce a time signal. Each of the individual production lines includes a third light barrier for sensing the readiness of its associated production line and for generating a readiness signal when the line is ready to receive a workpiece. All three signals (readiness, time, and interval) are fed to a control device associated with each of the deflectors. The control device is designed so that receipt of an interval signal, after readiness and time signals have been received, results in production of a deflection signal so that the deflector associated with the control device is moved to deflect a workpiece traveling on the main conveyor.

It is therefore the problem of the present invention to provide an apparatus which is simpler than the aforementioned apparatus and ensures trouble-free and rapid transfer of the tube sections at the intersections.

SUMMARY OF THE INVENTION

According to the present invention, this problem is solved in that at least three intersections are provided of which the second, third, and any others are so connected by conveyors to an intermediate conveyor located downstream of a first or feed conveyor that they extend the conveying path of the first conveyor up to the third or last intersection. Conveying lines leading to the processing stations are connected to the conveying path at the intersections by turntables consisting of at least two discs which are rotatable about spaced vertical axes, are disposed substantially in the conveying plane, onto which there can be lowered pressure tips arranged on levers pivoted to the discs as their rotary axes, and which feed the tube sections transversely to the inlet gap of the respective processing conveying line. Control means are provided which control the deflector and turntables so that the tube sections are fed, in order, to the third intersection, to the second intersection and, finally, to the first intersection. The apparatus of the invention permits distribution of the tube sections to downstream production lines by means of only a single deflector. At the intersections, the turntables receive the longitudinally supplied tube sections tangentially and discharge them to the conveyor leading to the respective processing station while changing their conveying direction and displacing them parallel in a transverse position.

BRIEF DESCRIPTION OF THE DRAWING

An example of the invention will be described in more detail with reference to the drawing, wherein.

DESCRIPTION OF THE PREFERRED EMBODIMENT

Figure 1:
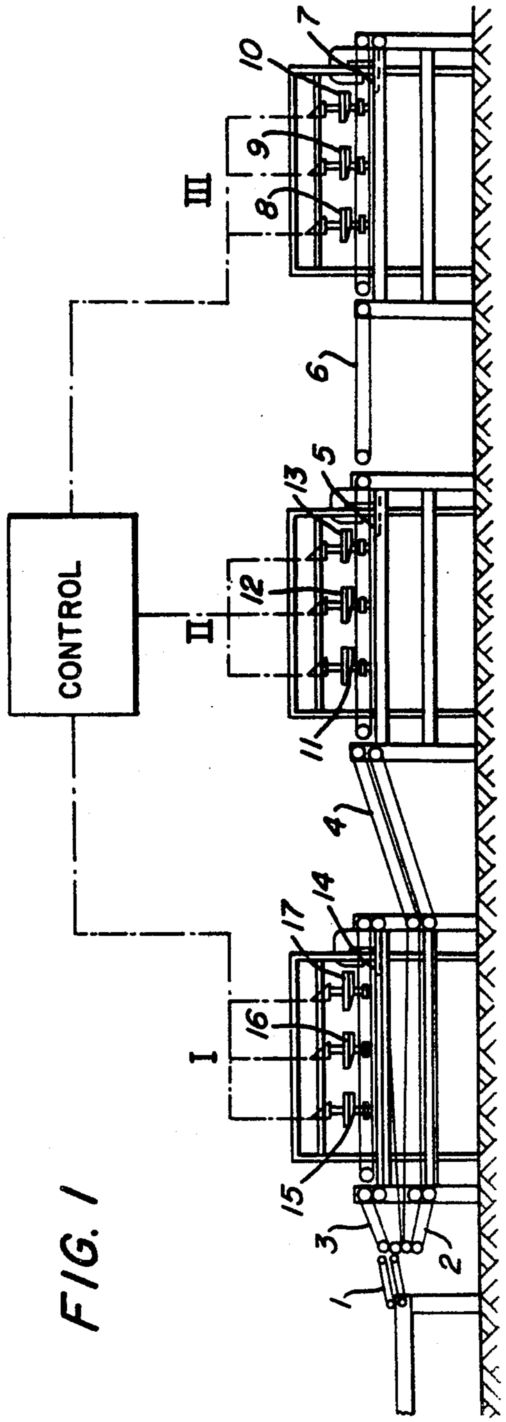
FIG. 1 is a diagrammatic side elevation of the main conveying line of the apparatus for distributing tube sections.

From a tube-making machine (not shown), tube sections are fed in the longitudinal direction by a conveyor (also not shown) to a deflector which consists of a double belt conveyor 1 pivoted at one end and which distributes every first two tube sections to the inlet gap of the intermediate conveyor which bridges the first intersection I and consists of a double belt conveyor 2, and every third tube section to the inlet gap of the connecting conveyor consisting of the double belt conveyor 3. The first tube section fed to the intermediate conveyor 2 arrives by way of the connecting conveyor 4, the conveyor 5 of the intersection II and the connecting conveyor 6 at the conveyor 7 of the intersection III. Three turntables 8, 9, 10 mounted in the frame of the intersection III are interposed in the conveying path of the conveyor 7, at least two of the turntables taking the longitudinally supplied tube section and, during one quarter of a revolution, retarding the speed in the initial conveying direction to zero and accelerating the transverse speed in the transverse conveying direction. Control means schematically illustrated in FIG. 1, such as light barriers and a control device of the type described in DE-OS No. 23 07 728, control the transfer and discharge of the tube sections by the turntables 8–10, 11–13, and 15–17.

Every second tube section distributed to the intermediate conveyor 2 is received in a corresponding manner by the turntables 11–13 at the intersection II and, while having its direction changed by 90°, fed in a transverse direction to the production line adjoining the intersection II.

The connecting conveyor 3 forms the inlet portion of the conveyor 14 of the intersection I. Every third tube section is apportioned by the deflector 1 to the conveyors 3, 14 so that it reaches the region of the turntables 15–17 of the intersection I. The turntables 15–17 receive the tube section in the described manner and lead it transversely to the inlet gap of the conveyor of the first production line.

Figure 3:
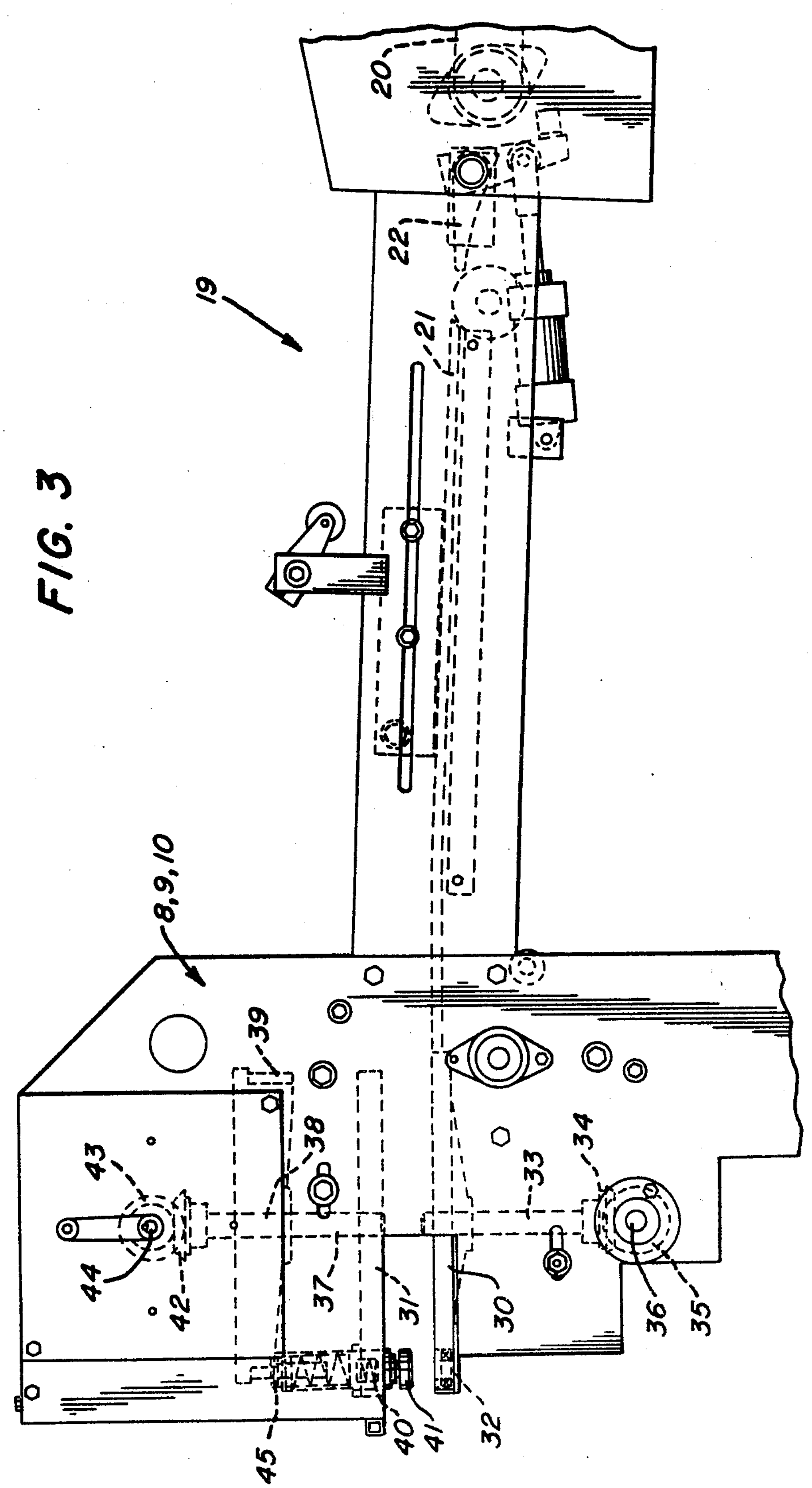
FIG. 3 shows diagrammatically in side elevation an intersection of the apparatus illustrated in FIG. 1.
Figure 4:
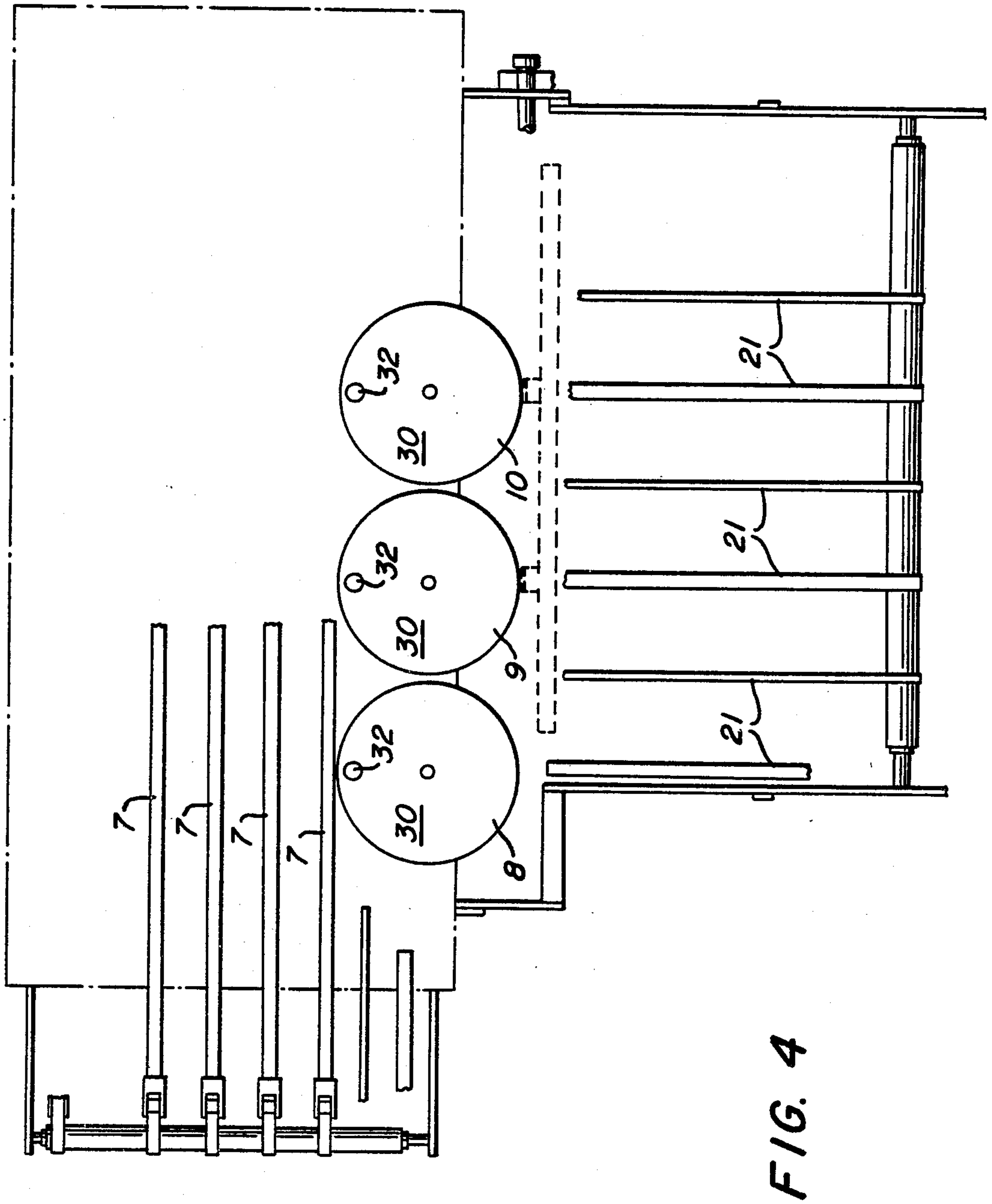
FIG. 4 shows diagrammatically a plan view of the intersection of FIG. 3.

Referring now to FIGS. 3 and 4, a representative intersection, such as III, is illustrated. The intersection has three turntables 8, 9, 10 because, in the case of the invention, the workpiece is not turned, but merely re-directed from the longitudinal position to a movement in a crosswise position. Thus, this involves a parallel shifting. This cannot occur by means of a single turntable, but requires at least two turntables.

As illustrated in FIGS. 3 and 4, each of the turntables 8, 9, 10, consists of a lower part 30, formed in the manner of a plate and an upper part 31, which consists of a dual arm lever. The upper edge of the turntables 8, 9, 10 is level with the upper leaders of the bands or belts 6 and 7 (not illustrated in FIGS. 3 and 4).

In the bottom part 30, in the vicinity of its periphery, a freely turnable bolt 32 is positioned, whose upper surface is level with the upper surface of bottom part 30. The bottom part 30 is driven in synchronism with movement of the bands 7 and the upper part 31. For this purpose, the bottom part 30 is attached to a shaft 33, on which a conical wheel 34 sits, which together with a conical wheel 35 of a main shaft 36 has a combing or meshing action.

The dual lever 31 is attached to a vertically arranged shaft 37 which is positioned in firm-stand storage box 38. On its bottom side, the storage box 38 carries a cam 39 formed akin to a ring. At the free end of the dual lever 31, a bolt 40 is positioned in gliding or sliding fashion, whose lower side 41 corresponds or is aligned with the bolt 32 of lower part 30. On the shaft 37, a conical wheel 42 is attached, which combs or meshes with a conical wheel 43, which is attached to a shaft 44 running synchronically with the main shaft 36. By means of the synchronic drive of lower part 30 and dual lever 31, the bolts or shafts 32 and 40 run in synchronism and in equal phases.

In the upper end of the bolt 40 a cam roll 45 is positioned for free rotation, which runs in contact with the cam 39. As a result, the bolt 40 is periodically moved towards and away from the bolt 32, so that the workpiece carried along by the bands 7 is periodically clamped between the bolts 32, 40 and is then freed again. The cam 39 is formed in such a way that the workpiece carried along by the bands 7 is grasped by the turntables and, after an appropriate turning movement, by which the workpiece comes into the range or inlet of the bands 21, it can be taken over by these belts when it is freed from the turntables.

Figure 5:
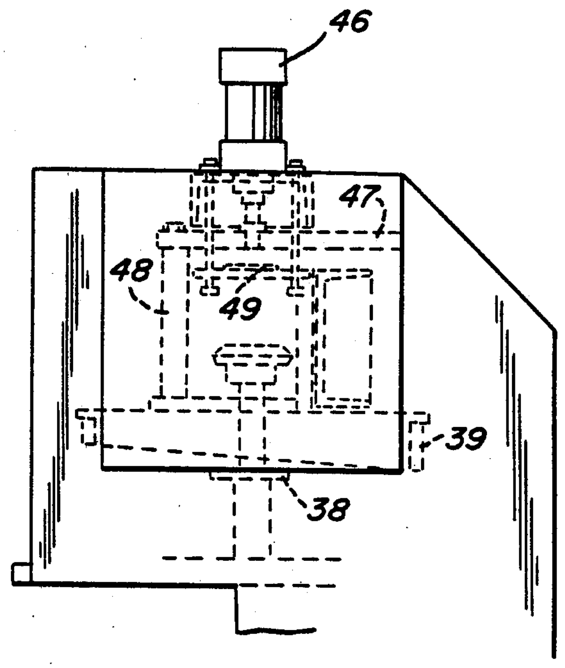
FIG. 5 shows diagrammatically in side elevation a portion of an intermediate intersection of the apparatus illustrated in FIG. 1.

According to the invention, at the crossing point II periodically every third workpiece, that is, the first, fourth, seventh, etc., workpiece, is passed through, without being re-directed towards the bands 21, to the crossing point III. For this purpose, as illustrated in FIG. 5, the cam 39 is periodically directed away from the turntables of this crossing point. A cylinder 46 is arranged in a firm stand. On its piston rod, a traverse 47 is attached on which bolts 48 are arranged which carry the cam 39. Thus, unlike the crossing points or intersections I and III, the cam 39 is not connected with the storage box 38. In FIG. 5, the cam 39 is represented in a lifted-off position. With this position of the cam 39, the workpieces can run through unobstructed from the crossing section I to the crossing position III. However, if the piston rod of the cylinder 46 is lowered to the firm position determined by attachment 49, the cam 39 comes into the effective reach of the cam roll or follower 45 so that cam 39 controls up and down movement of bolt 40 in the manner described above.

Figure 2:
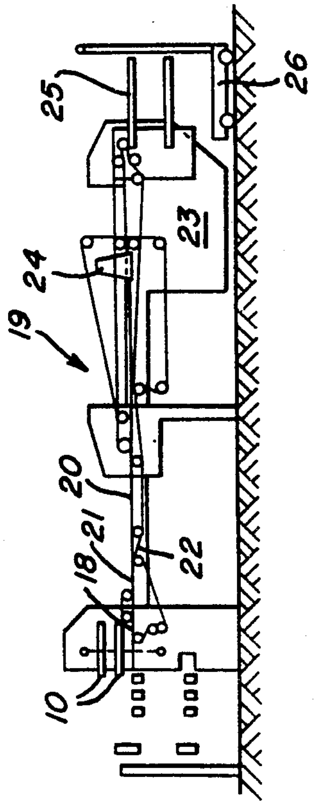
FIG. 2 is a diagrammatic side elevation of one production line.

FIG. 2 shows the sewing line 19 adjoining the intersection III. The turntables 8–10 lead the tube section in a transverse position into the inlet gap 18 of the belt conveyor 21. The belt conveyor 21 is connected to the belt conveyor 20 by way of a deflector 22 for sorting out tube sections. On the conveyor 20 the tube sections are transported in a transverse position so that the as yet open base ends of the tube sections project beyond the conveyor. The base ends are then rolled in or provided with applied rider tapes and stitched shut by the sewing head 24 of the base sewing machine 23. After severing the sewing threads, the sacks provided with base stitching are stacked on the stack support 25 from which the stacks drop onto the trolley 26 after they have reached the desired number of sacks.

While preferred forms and arrangements have been shown in illustrating the invention, it is to be clearly understood that various changes in detail and arrangement may be made without departing from the spirit and scope of this disclosure.

What is claimed is:

1. Apparatus for uniformly distributing tube sections continuously supplied in a longitudinal direction to a plurality of transversely arranged main conveying lines which lead to processing stations, preferably to sewing lines for applying base stitching to the tube sections, comprising: a connecting conveyor leading to a first main conveying line, an intermediate conveyor leading to a second of the main conveying lines, a deflector for selectively feeding tube sections to said connecting and said intermediate conveyors to thereby control distribution of the tube sections between said connecting and said intermediate conveyors, said connecting and intermediate conveyors extending transversely to said first main conveying line to define a first intersection, there being at least three intersections of which the second and third are so connected by transporting conveyors to the intermediate conveyor to extend the conveying path from the first main conveyor up to the last intersection, said main conveying lines including processing stations and extending from the intersections, said intersections including a plurality of turntables having at least two discs rotatable about spaced vertical axes and disposed substantially in the conveying plane, pressure tips lowerable towards the discs to releasably engage a tube section between the tips and the discs, means for rotatably supporting the pressure tips, said discs being rotatable to feed the tube sections transversely to inlet gaps of the main conveying lines, and control means for controlling the deflector and turntables so that the first tube section of a series of tube sections is fed to the last intersection and then other tube sections of the series are successively fed to the other intersections, with the first intersection being the last intersection fed, the conveying path being such that the tube section fed to the last intersection passes the turntables associated with the section intersection during its passage to the last intersection.

2. Apparatus according to claim 1, wherein there are three turntables at each intersection.

* * * * *